United States Patent
Barnes

[11] 3,762,658
[45] Oct. 2, 1973

[54] MEAT CUTTING AND EXTRUDING DEVICE
[76] Inventor: James H. Barnes, 283 Tolbert St., Wadsworth, Ohio
[22] Filed: Dec. 10, 1971
[21] Appl. No.: 206,644

[52] U.S. Cl. .................................. 241/82.5, 241/88
[51] Int. Cl. ........................................... B02c 18/36
[58] Field of Search ................. 241/82.1, 82.2, 82.5, 241/82.6, 82.7, 88

[56] References Cited
UNITED STATES PATENTS
| | | | |
|---|---|---|---|
| 3,063,361 | 11/1962 | Gehrke | 241/82.5 X |
| 2,990,576 | 7/1961 | Van Riper | 241/82.1 X |
| 3,360,820 | 1/1968 | Zitzmann | 241/82.1 X |
| 340,794 | 4/1886 | Leopold | 241/82.1 |
| 3,081,806 | 3/1963 | Oatley | 241/82.5 |
| 3,380,503 | 4/1968 | Rees | 241/82.5 |

Primary Examiner—Donald G. Kelly
Attorney—Vern L. Oldham et al.

[57] ABSTRACT

A meat cutting or grinding device including a frame in which an extruder is provided for moving meat along the axis of the extruder and a cutter means is present for cutting it into sections. The device includes a discharge plate or member perpendicular to the axis of the extruder and which discharge member has a plurality of axially extending apertures therein of reduced size adjacent their discharge ends. Or, these discharge apertures can be in the form of slots to provide relatively large pieces or flakes of meat as forced through the discharge by the extruder member.

3 Claims, 9 Drawing Figures

PATENTED OCT 2 1973 3,762,658
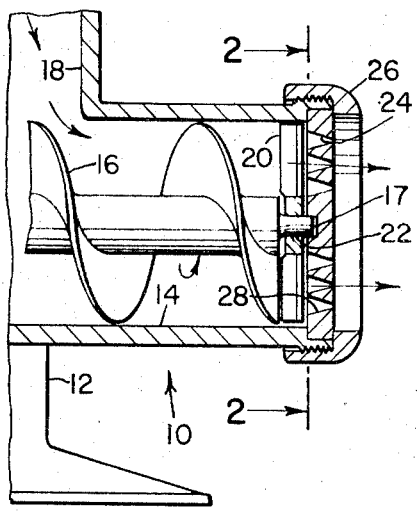
FIG. 1
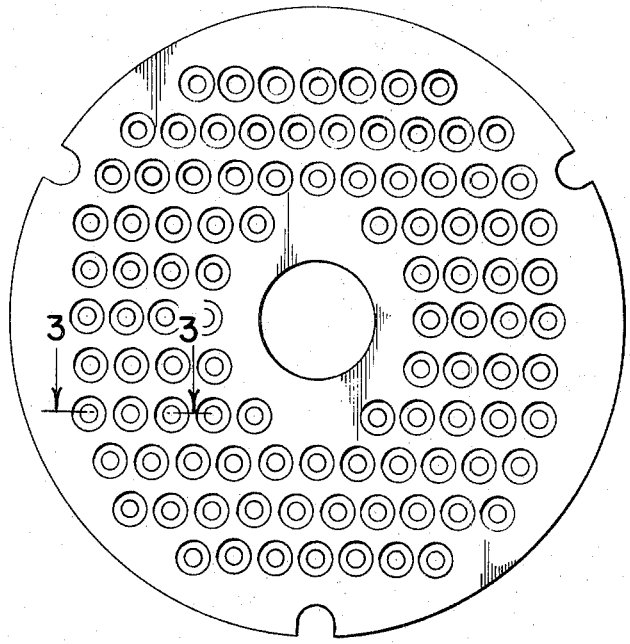
FIG. 2
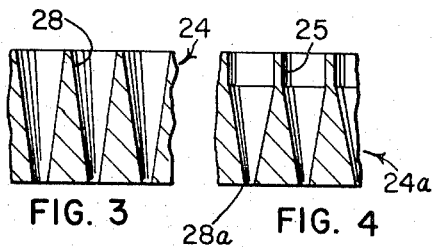
FIG. 3  FIG. 4
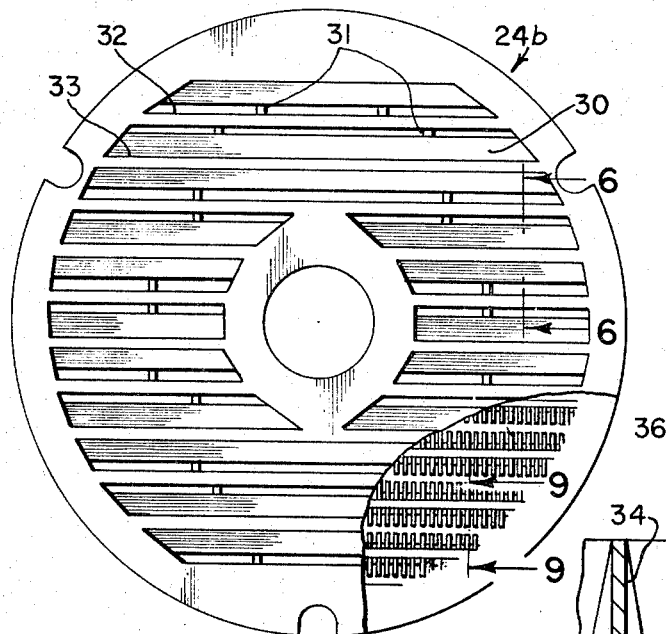
FIG. 5
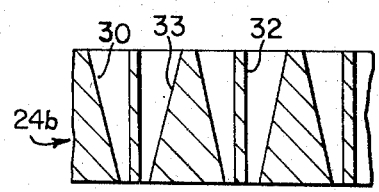
FIG. 6
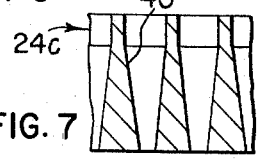
FIG. 7
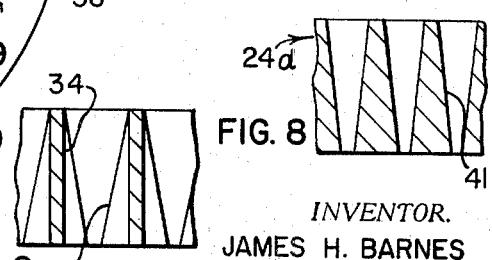
FIG. 8
FIG. 9
INVENTOR.
JAMES H. BARNES
BY
OLDHAM & OLDHAM
ATTORNEYS

MEAT CUTTING AND EXTRUDING DEVICE

This invention relates to meat cutting and/or grinding devices, and especially to such a member having a special discharge means or disc therein with specially contoured holes or slots therein for providing a shredding or tearing effect on the meat being processed.

Heretofore there have been many different types of meat cutting devices provided, but most of them have comprised a simple extruder member having an extrusion disc provided with a plurality of cylindrically shaped apertures therein for extruding the cut meat chunks into cylindrical segments or shapes. This type of a meat grinder or extruder has been in conventional use for many years.

It is the general object of the present invention to provide a novel and improved meat cutting or grinding device wherein the cut or ground meat particles produced may have a shape other than cylindrical.

A further object of the invention is to provide an improved, different type of a meat grinder wherein the meat is shredded and compressed in unusual manners as it is processed to break down the cells in the meat and to provide unusual and desirable softness and flavor characteristics in the ground meat.

Another object of the invention is to provide a relatively inexpensive but sturdy and improved type of a meat grinder having a special discharge or extrusion plate therein in which the meat is specially processed by being forced through and out of, and by being compressed and/or shredded in, the grinding device which otherwise can be of a conventional nature.

The foregoing and other objects and advantages of the invention will be made more apparent as the specification proceeds.

Reference now is made to the accompanying drawings, wherein:

FIG. 1 is a fragmentary vertical section through a meat grinder or extrusion member embodying the principles of the invention;

FIG. 2 is an enlarged front elevation of the extrusion discs shown in FIG. 1;

FIGS. 3 and 4 are modified enlarged sections of modifications of the extrusion disc of the invention;

FIG. 5 is an elevation of a further type of an extrusion device or disc showing two different types of extrusion openings for use in the apparatus of FIG. 1;

FIG. 6 is an enlarged fragmentary vertical section taken on line 6—6 of FIG. 5;

FIGS. 7 and 8 show modifications of the invention; and

FIG. 9 is a fragmentary enlarged vertical section taken on line 9—9 of FIG. 5.

When referring to corresponding members shown in the specification and referred to in the drawings, corresponding numerals are used to facilitate comparison therebetween.

With reference to the details of the structure shown in the drawings, a meat cutting or grinding device is indicated as a whole by the numeral 10. The device is of substantially conventional construction insofar as it includes a frame 12 having any desired type of a support provided therefor and which frame 12 defines a cylindrical extrusion chamber 14. A rotatable extrusion or forcing means in the form of a screw 16 is provided and it is positioned in the chamber 14 on the longitudinal axis thereof to substantially fill the same. This screw is provided with a manually or other type of a driven power handle or other member connected thereto for rotating this screw and moving any meat chunks or portions received in the chamber 14 axially thereof. This meat can be fed into the chamber 14 through a hopper 18 operatively connecting thereto. At the discharge end of the chamber 14, a cutter member 20 usually of conventional design is suitably operably secured to a shaft 22 of this screw 16 for rotation with the screw and shaft. Also, a discharge means, or cutter disc or plate 24 is firmly held against the discharge end of the chamber 14. This discharge means or cutter disc is secured against the end of the frame 12 as by a removable cap 26 engaging the frame 12 and retaining the disc 24 in position. The end of the screw 16 is journalled in a recess 17 in the disc 24.

FIGS. 2, 3 and 4 of the drawings best show that this cutter disc or discharge means 24 has a plurality of axially extending apertures or bores 28 provided therein. It is a particular feature of the invention that these bores or apertures are of reduced diameter as they progress towards the axially outer end of the cutter disc as operatively positioned. FIG. 3 particularly shows that these apertures 28 are of continually inwardly tapering design whereby reduction of area of these discharge openings of 50 percent or more occurs therein so that as the meat particles are forced into and through these apertures, there is a crushing or breaking of the cells in the meat and a tenderizing action is performed on the meat particles. The openings may be for example about one-eighth inch to one-fourth inch in diameter at their inlet ends and be about one-sixteenth inch in diameter at their discharge ends. Thus, meat particles discharged from the reduced diameter ends of these bores or apertures 28 have better flavor and a texture different from ordinarily extruded or ground meat.

FIG. 4 shows that the apertures 28a in the actual cutter disc 24a of this structure may have a cylindrical portion indicated at 25 formed therein at their axially inner ends, but then with the remaining portions of these bores decreasing in size to form reduced area outlets as referred to hereinbefore.

FIG. 5 of the drawings shows a modified discharge means or cutter disc 24b wherein the disc would be positioned in the same manner as shown in FIG. 1. However, in this instance, the cutter disc has a plurality of slots 30 formed therein with the slots preferably all being parallel and with the slots and/or the openings formed therebetween being of any desired size and the slots being of any suitable length. suitable cross partition means 31 can be provided in the elongate slots of this cutter member to aid in cutting the meat into particles as forced through the slots 30.

FIG. 6 shows one typical enlarged cross section wherein the drawing shows that the slots 30 are formed by one partition member 32 of generally rectangular shape and section whereas alternate walls or partitions 33 formed in the cutter disc 24b are of generally trapezoidal shape as indicated whereby again a reduction in the extrustion or flow area in the various slots or bores in the cutter disc is provided. Such apertures are of reduced size as the meat is forced toward the discharge end of these cutter bores. The specially shaped panels, partitions or cross wall sections 31 provided in this particular discharge means of the invention, of course, have sharp leading edges to aid in meat sheering, cutting or slicing action.

FIG. 9 shows an enlarged section of a portion of the cutter disc shown in FIG. 5 which is broken away to show a modified unit. In such disc, a plurality of relatively thin tapered knives or cutting sections 36 are provided on axially spaced parts of the walls 34. This construction materially aids in cutting or shredding the meat being processed to tenderize the same, break down the cells in the meat and provide an improved flavor. Flakes or shredded meat particles can be obtained by this construction.

FIGS. 7 and 8 show yet other discharge means in enlarged section and wherein a plurality of the cutting fingers or knives, as indicated in FIG. 9, may be provided on adjacent walls in the cutter disc, or the slotted sections may just be of gradually reduced area in approaching the discharge edges thereof. Thus, the construction shown in FIG. 7 includes a cutter disc or discharge means 24c and a similar cutting disc or discharge means 24d is provided in FIG. 8, but within all instances the meat having a shredding and cutting and compressing action exerted thereon as it is forced through the discharge means of the apparatus. Thus a plurality of parallel walls 40 of the same shape are present in the disc 24c. Similar walls or cutter bars 41 are provided in the disc 24d.

The inner faces of the cutter discs normally are flat and cutting edges are provided on the inlet ends of the apertures therein.

While several complete embodiments of the invention have been disclosed herein, it will be appreciated that modification of these particular embodiments of the invention may be resorted to without departing from the scope of the invention.

What is claimed is:

1. In a meat cutting and/or grinding device, a frame in which an extruding or forcing means is provided for moving meat along the axis of such means, the combination of a discharge means carried by said frame and positioned normal to said axis, said discharge means having a plurality of axially extending apertures therein which are of reduced size adjacent their discharge ends, said discharge means apertures extending therethrough and forming discharge areas, and a rotatable cutter means immediately adjacent said discharge means for cutting the meat into small pieces;

said apertures being in the form of slots parallel to each other; and said slotted apertures having cross partition cutter means provided therein.

2. In a meat cutting and/or grinding device, a frame in which an extruding or forcing means is provided for moving meat along the axis of such means, the combination of a discharge means carried by said frame and positioned normal to said axis, said discharge means having a plurality of axially extending apertures therein, said discharge means apertures extending therethrough and forming discharge areas, and a rotatable cutter means immediately adjacent said discharge means for cutting the meat into small pieces;

said apertures being in the form of slots parallel to each other, and a plurality of tapered cutter means operatively associated with said slots.

3. A device as in claim 2 where said tapered cutter means are formed on only some of the members defining said slots and are spaced along such members.

* * * * *